US012627988B2

(12) United States Patent
Stanciu et al.

(10) Patent No.: US 12,627,988 B2
(45) Date of Patent: May 12, 2026

(54) COMMUNICATION DEVICE AND METHOD FOR MONITORING A WIRELESS COMMUNICATION EXCHANGE

(71) Applicant: NXP USA, Inc., Austin, TX (US)

(72) Inventors: Mihai-Ionut Stanciu, Bucharest (RO); Zahir Smail, Cairon (FR); Khurram Waheed, Austin, TX (US); John Edward Vandermeer, Spicewood, TX (US)

(73) Assignee: NXP USA, Inc., Austin, TX (US)

( * ) Notice: Subject to any disclaimer, the term of this patent is extended or adjusted under 35 U.S.C. 154(b) by 322 days.

(21) Appl. No.: 18/447,662

(22) Filed: Aug. 10, 2023

(65) Prior Publication Data

US 2024/0089739 A1 Mar. 14, 2024

(30) Foreign Application Priority Data

Sep. 7, 2022 (RO) .............................. a 2022 00546

(51) Int. Cl.
*H04W 12/80* (2021.01)
*H04B 17/364* (2015.01)
*H04W 48/00* (2009.01)

(52) U.S. Cl.
CPC .......... *H04W 12/80* (2021.01); *H04B 17/364* (2015.01); *H04W 48/17* (2013.01)

(58) Field of Classification Search
CPC ..... H04W 12/80; H04W 48/17; H04B 17/364
See application file for complete search history.

(56) References Cited

U.S. PATENT DOCUMENTS

| | | | | |
|---|---|---|---|---|
| 9,463,325 | B1 * | 10/2016 | Young | .................. H04W 12/04 |
| 10,797,975 | B2 | 10/2020 | Koffman | |
| 11,128,544 | B2 | 9/2021 | Rouhi et al. | |
| 2021/0136586 | A1 | 5/2021 | Babu et al. | |

FOREIGN PATENT DOCUMENTS

WO WO-2022/096515 5/2022

* cited by examiner

*Primary Examiner* — Duc C Ho

(57) ABSTRACT

A communication exchange between two wireless communication devices is monitored. A communication device configured to function as a Sniffer device synchronizes the communication device to a frequency and a timing employed between the two wireless communication devices on a main wireless communication channel. The wireless communication exchanges are monitored, in which the wireless communication exchanges are packet-based data exchanges or tone-based data exchanges. The operations for wireless communication exchanges are repeated across a plurality of different frequencies. The communication device then combines a plurality of phase and/or magnitude measurements and determines a value of phase and/or magnitude error introduced by each device based on the combined plurality of phase and/or magnitude measurements.

15 Claims, 7 Drawing Sheets

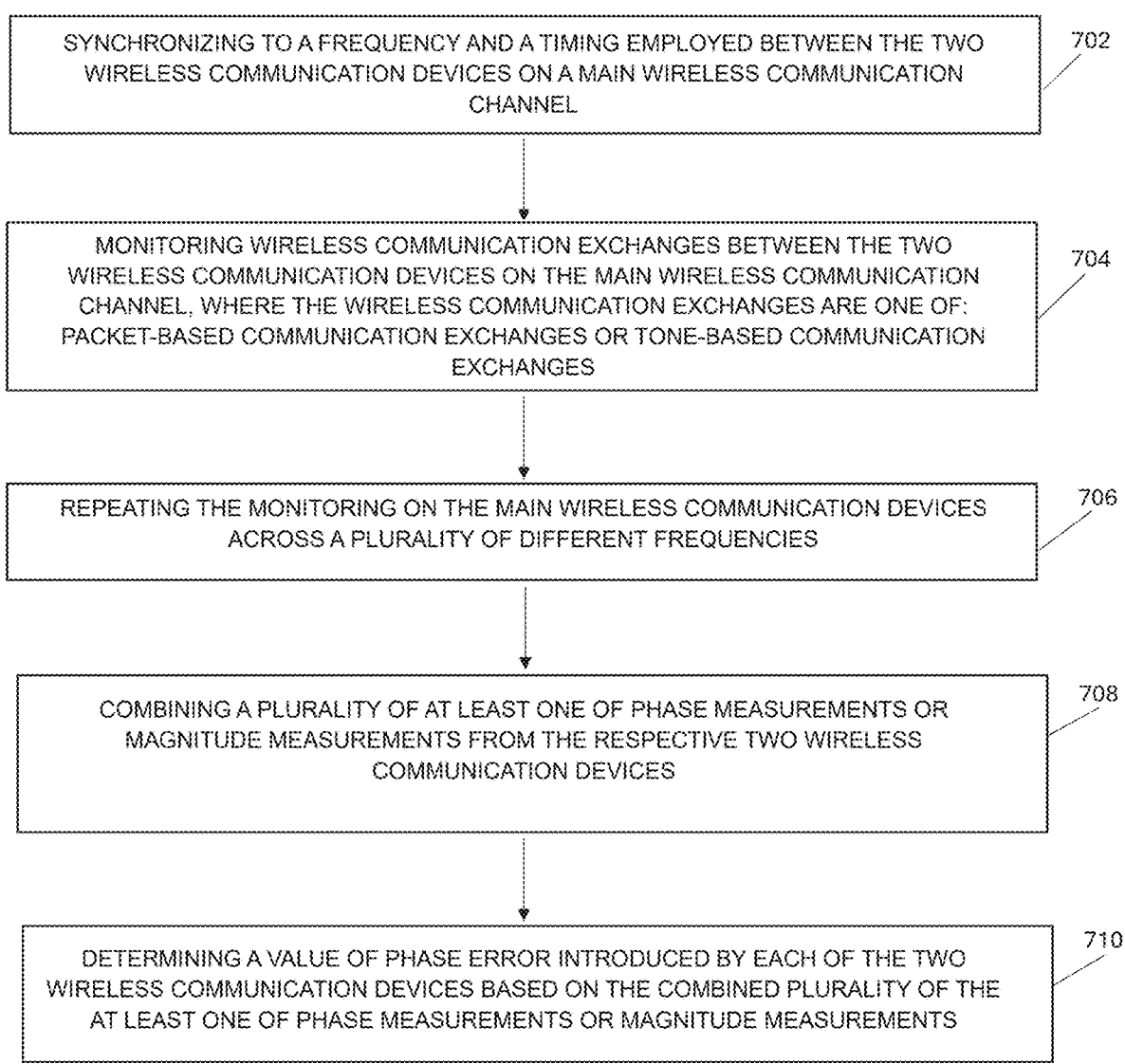

700

SYNCHRONIZING TO A FREQUENCY AND A TIMING EMPLOYED BETWEEN THE TWO WIRELESS COMMUNICATION DEVICES ON A MAIN WIRELESS COMMUNICATION CHANNEL — 702

MONITORING WIRELESS COMMUNICATION EXCHANGES BETWEEN THE TWO WIRELESS COMMUNICATION DEVICES ON THE MAIN WIRELESS COMMUNICATION CHANNEL, WHERE THE WIRELESS COMMUNICATION EXCHANGES ARE ONE OF: PACKET-BASED COMMUNICATION EXCHANGES OR TONE-BASED COMMUNICATION EXCHANGES — 704

REPEATING THE MONITORING ON THE MAIN WIRELESS COMMUNICATION DEVICES ACROSS A PLURALITY OF DIFFERENT FREQUENCIES — 706

COMBINING A PLURALITY OF AT LEAST ONE OF PHASE MEASUREMENTS OR MAGNITUDE MEASUREMENTS FROM THE RESPECTIVE TWO WIRELESS COMMUNICATION DEVICES — 708

DETERMINING A VALUE OF PHASE ERROR INTRODUCED BY EACH OF THE TWO WIRELESS COMMUNICATION DEVICES BASED ON THE COMBINED PLURALITY OF THE AT LEAST ONE OF PHASE MEASUREMENTS OR MAGNITUDE MEASUREMENTS — 710

FIG. 7

COMMUNICATION DEVICE AND METHOD FOR MONITORING A WIRELESS COMMUNICATION EXCHANGE

CROSS-REFERENCE TO RELATED APPLICATIONS

This application claims the priority under 35 U.S.C. § 119 of Romania application no. A202200546, filed on 7 Sep. 2022, the contents of which are incorporated by reference herein.

FIELD OF THE INVENTION

The field of the invention relates to a radio communication unit, and a method for monitoring a wireless communication exchange. The field of the invention is applicable to, but not limited to, monitoring of a wireless communication exchange between two wireless communication devices and determining a distance between these respective wireless communication devices.

BACKGROUND OF THE INVENTION

The use of radio communication systems is increasing rapidly, in areas such as the 'Internet of Things (IoT™)', which includes home automation, a variety of peer-to-peer communication applications, such as Apple™'s "Airdrop™", or personal-exercise systems with a variety of physiological monitoring devices and many others. Many of these applications use the Bluetooth™ radio standard, which has become very well established, widely supported and developed.

Localization testing is a known approach to check the content, user interfaces, functionality, and usability of software as it appears in multiple locations in a communication system. In such communication systems where radio communication devices appear in multiple locations, it is sometimes important to determine a distance between respective radio devices, so that the system can ensure that communications between certain devices can be achieved in a reliable manner. In narrowband localization systems, two or more devices are involved in determining such distance estimation.

FIG. 1 illustrates a known signalling approach 100 that provides distance estimation in a localization system. In distance estimation, there is first a synchronisation step 110, followed by multiple tone exchanges between two radio devices, 120, 122 (with only two exchanges shown for simplicity purposes only. In the synchronisation step 110, a first radio device transmits a synchronisation ('synch') pattern 130 that is received by a second radio device, which then processes the received synch pattern 130 and retransmits 132 it to the first radio device. In this manner, the second radio device (sometimes referred to as a 'Reflector device') aligns its timing to the first radio device (sometimes referred to as an 'Initiator device') and the Initiator device aligns its local oscillator (LO) frequency to that of the Reflector device. This is performed to align (in time) the crystal (local) oscillators of the Initiator device and the Reflector device, which are not a priori aligned in time prior to the wireless exchange (and noting that the two devices may have different crystal precisions and could drift in opposite direction thereby causing timing and frequency misalignments). Thus, the synchronisation step is used to estimate any such timing misalignment and compensate for it.

On a certain radio frequency (RF) channel, a first device is transmitting an unmodulated carrier frequency, whilst the second device is receiving the unmodulated carrier frequency. Thereafter, the second device is transmitting the unmodulated carrier frequency, whilst the first device is receiving the unmodulated carrier frequency. Whilst receiving, each device performs a phase measurement in order to identify a phase change of the transmitted signal. Then, both Initiator device and Reflector device are hopping synchronously onto the next communication channel and they then perform the same process. Thus, in this manner, each two-way exchange occurs on a different RF channel, so that all the available frequencies are mapped, at least once, during one distance measurement exchange. The exchange of signals on different radio frequencies needs to be time synchronized, i.e., the RF frequency hopping needs to happen synchronously. Channel sounding information is then exchanged on the subsequent operations, using two-way exchanges 134 and 136, 138 and 140, etc. of tones (or data packets) between the Initiator device and the Reflector device. After hopping through all RF channels, each of the Initiator device and the Reflector device has performed its own set of phase measurements. However, each device is also introducing phase errors of its own due to RF impairments in its circuitry (mainly due to phase noise and local oscillator phase inconsistency when switching between transmit (TX) and receive (RX) operational modes).

It is also known that it is often useful to be able to analyse a radio communications channel for the purposes of troubleshooting or performance monitoring of communications between devices, and communication units. Signal analysers have been developed and used for this purpose. A signal analyser used in a research and development environment may be connected to the device(s) under test (DUT), e.g., two radio communication units coupled together by wired connections, which provides a stable and well characterised interface for testing purposes, or alternatively coupled together via a wireless interface, or a mixture of both.

Communication units, known as 'Sniffers', have also been developed and are, in effect, signal analysers that are used to listen to radio transmissions. These Sniffers use radio interfaces and provide a means for wirelessly listening to radio frequency (RF) communications and analyse the protocols that are being used. Example Sniffer communication units have been developed and include the low cost nRF52840 from Nordic™ that can connect and listen to a variety of Bluetooth™ protocols, such as Bluetooth™ 6.3, Mesh, Thread™, Zigbee™, 802.15.4, ANT™ and other proprietary 2.4 GHz Protocols, or a high-performance device, such as the Ellisys™ Bluetooth™ tracker. However, such known Sniffer communication devices do not provide more detailed information regarding the characteristics of the two communicating radios and the communication channel itself.

Accordingly, the inventors of the present invention have identified a need for a method of monitoring of a communication exchange between two wireless communication devices and extracting information regarding the communication devices taking part in the communication, as well as a (Sniffer) communication device for implementing this method. In particular, for, say, a narrowband localisation system, the inventors of the present invention have identified a need to determine how much phase error is being introduced by each individual communication device in a two-way exchange between the Initiator device and a Reflector device. The inventors have identified that this information can be used to debug/evaluate the implementation and/or configuration of the devices. In addition, in some applications, this information can be used to determine more accurately a distance between these respective wireless communication devices.

SUMMARY OF THE INVENTION

The present invention provides a communication device and a method for monitoring a communication exchange between two wireless communication devices, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 7 illustrates an example flowchart of a method of monitoring a communication exchange between two wireless communication devices, according to an example of the invention.

DETAILED DESCRIPTION

Figure 1:
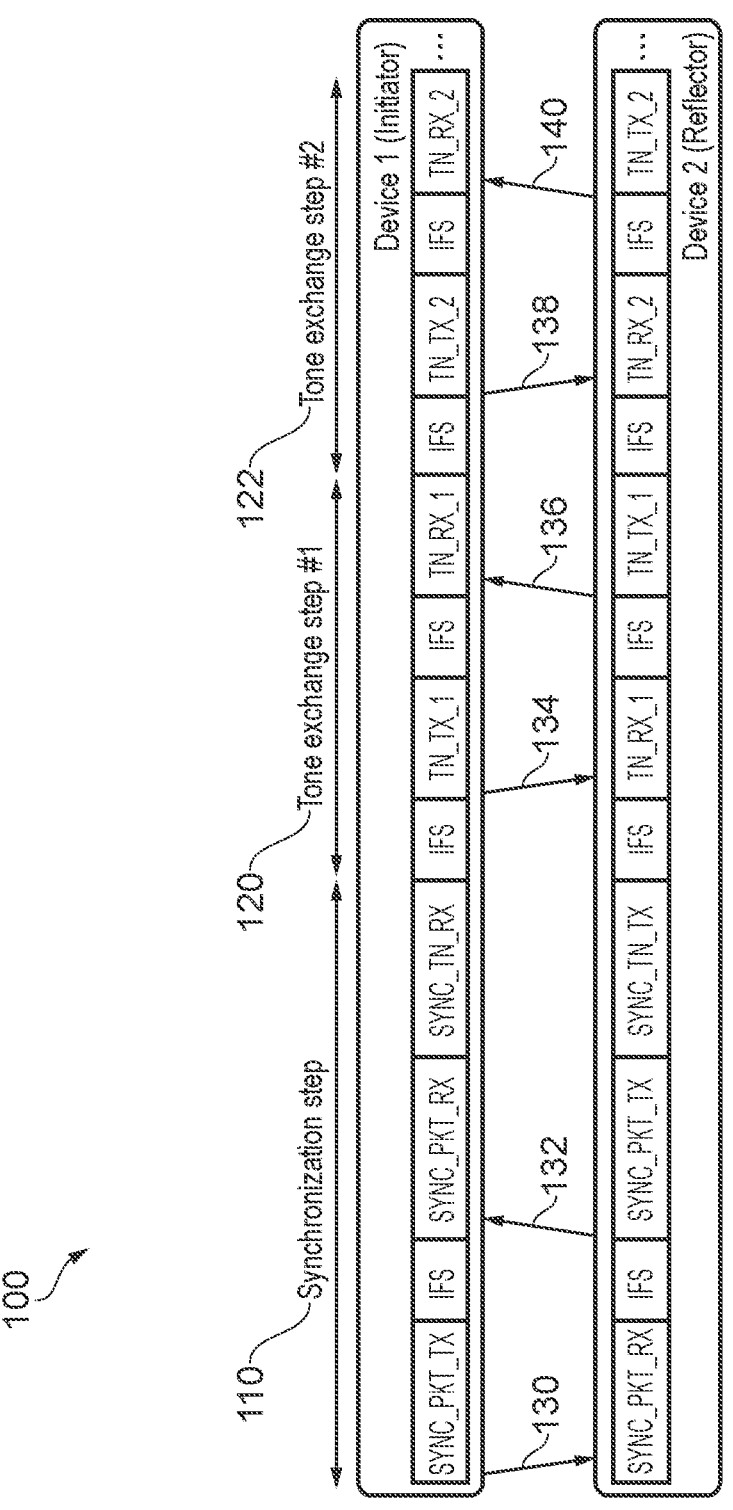
FIG. 1 illustrates a known signalling approach to distance estimation in a localization system.

Some examples of the invention propose a communication device configured to operate as Sniffer device that may be used, for example in a low-complexity, low-cost, narrowband radio localization system to determine how much phase and/or magnitude error is being introduced by each of an Initiator device and a Reflector device in a two-way exchange between themselves, for example in a distance measurement operation. In some examples, the narrowband radio localization system uses a multi-carrier, packet-based and/or tone-based approach to collect the channel sounding information, which may then be further used by a distance estimation algorithm employed by the Sniffer device.

Although known Sniffer communication units do not provide more detailed information regarding the characteristics of the two communicating radios and the channel itself, the inventors of the present invention have recognised and appreciated that such information, if obtainable, would allow a more detailed analysis of the communication channel that could be useful in a variety of applications.

In accordance with examples of the invention, the Sniffer device is configured to synchronize to, and be able to follow reasonably accurately, the frequency and the timing agreed by the Initiator device and Reflector device. In some examples, the Sniffer device may also be configured to have access, for example using at least one side communication channel that is separate from the main communication channel used by the Initiator device and Reflector device, where the at least one side communication channel may be used obtain the measured phase/time-stamp measurements performed by the Initiator device and Reflector device. It is envisaged that, in this example, the at least one side communication channel may take a form of a wireline static communication channel or a wireless communication channel employing a communication protocol, if the Sniffer has access to the security keys of the communication protocol. In some examples, the Sniffer device may also be configured to run a post-processing algorithm to perform a protocol analysis.

In some examples, when the Initiator device and the Reflector device are hopping through different channels, the devices may not maintain phase coherency. Therefore, in order to obtain a correct view of the channel frequency response, the Sniffer device is also configured, when receiving and performing at least one of quadrature measurements and phase and/or magnitude measurements that are performed in a phase domain with tone-based data exchanges, to combine phase and/or magnitude measurements from both devices. The device combining the results, e.g., the Sniffer device, may decide to multiply the IQ values (in a Cartesian operation) or add the phases (in a polar operation) depending on the complexity of the implementation). Alternatively, the device combining the results, e.g., the Sniffer device, may decide to add phase and/or magnitude measurements or multiply IQ values. In this manner, the device combining the results, e.g., the Sniffer device, may be able to determine how much phase and/or magnitude error is being introduced by each device.

It is envisaged that one example narrowband radio localization system and application that may benefit from the concepts herein described is a Bluetooth™ radio configured to measure the time-stamps of the data packets or the phase and/or magnitude of the tones, across the 80 MHz ISM band, in order to produce a secure distance measurement. In order to avoid the necessity of coherent operation of the radio systems, both packet-based and the tone-based distance may be determined by using a two-way exchange on each available communication channel.

In some examples, the proposed concepts can have multiple purposes, one of them being the testing of the phase and/or magnitude quality for one or more devices involved in the narrowband localization process. In some examples, the proposed concepts may be configured to receive and decode a narrowband distance ranging protocol standardized at the Bluetooth™ SIG.

Examples herein-described present a communication unit configured to perform a Sniffer operation associated with, and capable of being used in, a low-complexity, low-cost narrowband radio localization system. One example targeted narrowband radio localization system uses a multi-carrier, packet-based and/or tone-based approach to collect the channel sounding information that may be processed by the communication unit to provide secure distance estimates. In order to avoid the necessity of coherent operation of the narrowband radio localization radio system, both packet-based and the tone-based distance may be determined by using a two-way exchange on each channel, which may be used for testing the quality of the phase and/or magnitude and time-stamp measurements of communication signals from one or more communication units involved in the narrowband localization process.

In order for a device to determine a distance, the device needs to know the time stamps and, say, quadrature (IQ) samples measured at both communication devices. This means that one of the two devices needs to be able to transfer the time stamps and the IQ samples via, say, protocol packets on the wired or wireless at least one side communication channel to the device that is running the distance estimation algorithm.

Thus, the two communication devices that are part of the communication ('ranging') exchange and perform measurements and at least one of these two devices is configured to transfer the ranging information to the device that is running the distance estimation algorithm, e.g., the Sniffer device. In a case of a Sniffer device monitoring a ranging exchange between two devices (DUTs), the Sniffer device may be configured to perform the same (or similar) distance estimation algorithms if the Sniffer device receives the required information from both sides of the communication exchange, noting that this may imply some additional side communication channel transfers above and beyond that required between the two communication devices participating in the ranging exchange.

Distance estimation may be used to determine proximity of devices (if a single distance is measured) or an exact location (through trilateration if multiple distances are measured from multiple anchors, e.g., real time location systems).

It is envisaged that examples of the invention are applicable for use in a wide variety of applications, where the examples are used to 'sniff' the communication exchanges used by these applications, such applications including automotive and smart home access (keyless car access, user-experience car features (e.g., open trunk when user is approaching the back of the car), keyless door lock entry, etc.), security parameter enforcement, industrial, networking and medical domains, etc. Further envisaged examples include location-based user authentication, location-based user-experience (e.g., change light settings in a house based upon user location), user identification (e.g., unlocking a laptop when detecting an user's smartphone is in proximity), etc. Some examples herein-described also find particular use in narrowband localization, for example localization solutions using the Bluetooth Low Energy (BLE™) standard, and particularly an ability to provide an accurate and efficient testing methodology.

Examples herein described provide a method for analyzing a radio frequency (RF) communication between an Initiator radio ('I') with a normally distributed channel-k timing error $$\varepsilon_I^k,$$

and a Reflector radio ('R') with a normally distributed channel-k timing error $$\varepsilon_R^k,$$

using a third communication device configured to operate as a "Sniffer" radio ('S'). The method involves identifying a radio transmission of a first data packet from radio 'I', where the radio transmission includes a first departure time stamp T $$T_1^k,$$

The method involves a first reception of this data packet at radio 'R' and generation of an arrival timestamp $$T_2^k,$$

The method further involves a radio re-transmission, on the same channel, of a data packet from radio 'R' and a generation of a second departure timestamp $$T_3^k.$$

For increased security, it is envisaged that the re-transmission may use a bit pattern different from the initial transmission. The method further involves a second reception of this data packet at radio 'I' and a generation of a second arrival timestamp $$T_4^k,$$

The method further involves a capture of over-the-air transmissions from radio 'I' and radio 'R' by radio 'S', including quadrature (IQ) values and generation of third and fourth arrival timestamps $$T_{s,1}^k, T_{s,2}^k,$$

The method further involves a transmission of all timestamps and IQ values from radio 'I' and radio 'R' to radio 'S', via one or more side communication channels, calculation of a value $$\Delta T_I^k = T_4^k - T_1^k,$$

calculation of a value $$\Delta T_R^k = T_3^k - T_2^k,$$

calculation of a value $$\Delta T_S^k = T_{S,2}^k - T_{S,1}^k$$

calculation of a value $$\Delta T_I^k - \Delta T_S^k,$$

calculation of a value $$\Delta T_R^k - \Delta T_S^k.$$

The above steps are repeated multiple times across the frequencies available for the data exchange communication for example all hopping frequencies on multiple channels, and calculation of statistical mean values of the differences $$\left(\Delta T_I^k - \Delta T_S^k\right)$$

and $$\left(\Delta T_R^k - \Delta T_S^k\right),$$

these values converge to the channel timing errors of the respective radios 'I' and $$'R' \varepsilon_I^k$$

and $$\varepsilon_R^k.$$

In this manner it is possible to determine specific parameters of the radio communication channel and the devices involved in the communication, such as phase off-sets, drift rates and stochastic timing errors, which in turn allows accurate measurements of the signal propagation times, referred to as Time of Flight (ToF) and hence the distance between radios. Furthermore, the use of a third Sniffer device allows the apportioning of errors to the individual radios.

In some examples, the device 'S' exchanges data packets with radios 'I' and 'R' via both a radio interface and radio side communication channels. In this manner, the device 'S' obtains packet timing using measured Time Stamps on received packets or IQ phase and/or magnitude values on received tones, recorded locally at radios 'I' and 'R' and also the transmitted data itself allowing inferences to be made regarding the timing and phase and/or magnitude errors of the individual radios.

In some examples, the radio 'S' exchanges data packets with the radios 'I' and 'R' via a radio interface and at least one wired interface. In this manner, the delays and jitter associated with a radio side communication channels communications interface can be eliminated, thus increasing the accuracy of the calculations and simplifying the procedure.

In some examples, the radio 'S' uses the measured propagation times to calculate the distances between radios 'I' and 'R', wherein the provided distance has a higher accuracy than the one measured by the radio devices 'I' and 'R' themselves. In addition, it is envisaged that this information may be used by the Sniffer radio 'S' to supplement a distance computed by the devices alone when the radio devices 'I' and 'R' are far apart, for example when the Sniffer radio 'S' is engaged as the radio devices 'I' and 'R' move closer to each other. For example, in a car access scenario, the Sniffer radio 'S' could be located in the car together with the active device running measurements and the Sniffer radio 'S' is engaged when the user gets close to the car. Thus, in this manner, it is possible to carry out a range of process steps or tasks based on a more accurate knowledge of the positions of the radios.

In some examples, the communication device configured to function as a Sniffer device may have a priori knowledge of at least one of the following parameters in the communication exchange on the main communication channel: the modulation being used, the frequency hopping timing being used, the frequency hopping pattern being used, whether to expect a packet or a tone, the duration of the tone signals, the data-rate and modulated bits for the packets, and the method or signal processor of the sniffer device may further comprise synchronizing by the communication device with the communication exchange after first receiving a packet or a tone on the main communication channel.

In some further examples the radio 'S' compares calculated propagation delays and distances with timestamps reported by the radios in order to determine whether the radios are reposting plausible information. In this way it would be possible to advantageously detect a man-in-the-middle attack or other similar safety issues regarding the communications channel.

In some examples the radio 'S' compares the accuracy of generated time stamps and determines whether radio devices 'I' and 'R' are operating within specifications. In this manner it is possible to quickly and accurately determine whether a radio is performing as specified and required or whether it is operating out of specification and possibly causing problems to other radio (communication) units within the radio channel.

In other examples herein-described, the radio 'S' collects and combines quadrature (IQ) values $$IQ_{IR}^k, IQ_{RI}^k,$$

obtained via the at least one side communication channels and IQ values $$IQ_{IS}^k, IQ_{RS}^k$$

received over-the-air as follows:

$$IQ_{R,combined}^k = \qquad\qquad\qquad [1]$$

$$IQ_{IR}^k * conj\left(IQ_{IS}^k\right) * IQ_{RS}^k = e^{j\left(\varphi_k^{R,TX} - \varphi_k^{R,RX}\right)} * e^{j\left(\Delta\Phi_k - \Delta\Phi_k^{IS} + \Delta\Phi_k^{RS}\right)}$$

$$IQ_{I,combined}^k = \qquad\qquad\qquad [2]$$

$$IQ_{RI}^k * conj\left(IQ_{RS}^k\right) * IQ_{IS}^k = e^{j\left(\varphi_k^{I,TX} - \varphi_k^{I,RX}\right)} * e^{j\left(\Delta\Phi_k + \Delta\Phi_k^{IS} + \Delta\Phi_k^{RS}\right)}$$

It can be seen that the right-hand side (RHS) of these equations is a combination of a predictable linear phase and/or magnitude error and a radio-specific error, which can be determined by further signal processing. In this way it is possible for the Sniffer device to calculate the error contributions of the individual radios to the overall error.

Although examples are described with reference to a Sniffer device with a radio interface, it is envisaged that in other examples, data could be exchanged between the Sniffer device and each of the radios 'I' and 'R' via wired connections and a further radio connection in which case the Sniffer device is configured to act as a signal analyzer and can accurately determine the performance of each of the radios.

In other examples, the Sniffer device may also be of modular construction with a radio part and a separate processing unit, such as a PC or other embedded processing system or it may have multiple radios or be connected to further Sniffer devices, either in a wired or wireless manner. It is envisaged that examples herein described may also be used as part of a larger system for performing more complex tasks requiring position estimation, such as for vehicle access (security) or building access.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 2:
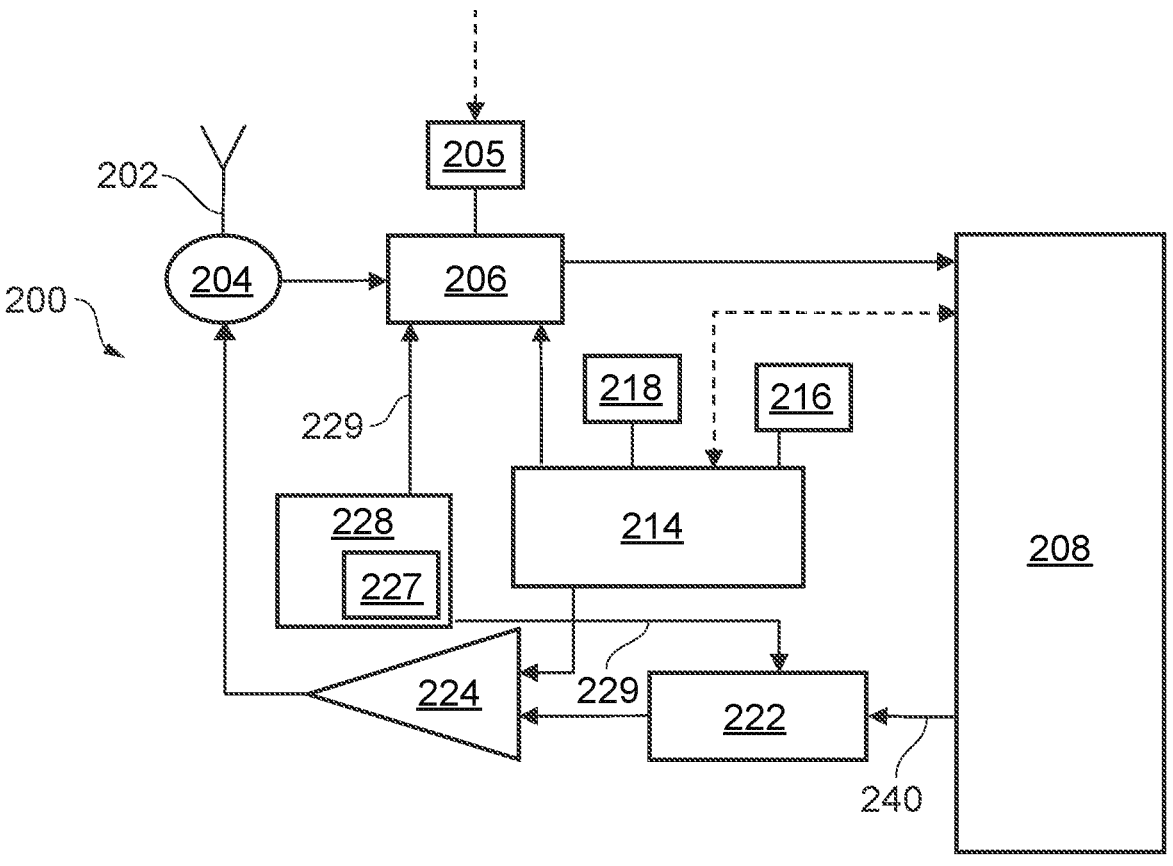
FIG. 2 illustrates a simplified drawing of a radio communication unit, adapted according to some examples of the invention.

Referring now to FIG. 2, a block diagram of an example wireless communication device 200, adapted to operate as a Sniffer device in accordance with some example embodiments of the invention, is shown. The wireless communication device 200 contains an antenna 202, for radiating signals and/or for receiving wireless transmissions, coupled to an antenna switch 204 that provides isolation between receive and transmit chains within the wireless communication unit 200. One or more receiver chains, as known in the art, include(s) receiver front-end circuitry 206 (effectively providing reception, filtering and intermediate or base-band frequency conversion). In some examples, the antenna may be an antenna array that includes multiple antenna elements that each provide a receive path carrying a received signal to the receiver front-end circuitry 206.

The receiver front-end circuitry 206 is coupled to a signal processor 208 (generally realized by a Digital Signal Processor (DSP)). A skilled artisan will appreciate that the level of integration of receiver circuits or components may be, in some instances, implementation-dependent.

A controller 214 maintains overall operational control of the wireless communication unit 200. The controller 214 is coupled to the receiver front-end circuitry 206 and the signal processor 208. In some examples, the controller 214 is also coupled to at least one memory device 216 that selectively stores, e.g., data relating to operating functions of the communication unit 200. A timer 218 is operably coupled to the controller 214 to control the timing of operations (e.g., transmission or reception of time-dependent signals) within the wireless communication unit 200.

For completeness, the wireless communication unit 200 has a transmit chain that includes transmitter/modulation circuitry 222 and a power amplifier 224 coupled to the antenna 202, which may comprise for example an antenna array, or plurality of antennas. The transmitter/modulation circuitry 222 and the power amplifier 224 are operationally responsive to the controller 214. In some examples, the power amplifier 224 and/or transmitter/modulation circuitry 222 may include multiple transmit paths carrying a transmit signal to the antenna 202 (or antenna array). Frequency generation circuit 228 includes at least one local oscillator, LO, 227 and is operably coupled to the receiver front-end circuitry 206 and the transmitter/modulation circuitry 222 and arranged to provide local oscillator signals 229 thereto.

In some example embodiments, multiple parallel radio frequency (RF) amplifiers, circuits or devices, may be employed in one or more of: receiver front-end circuitry 206 (e.g., a plurality of LNAs), transmitter/modulation circuitry 222 (e.g., a plurality of programmable gain amplifiers (PGAs)) or power amplifier 224. Clearly, a number of the various components within the wireless communication unit 200 can be realized in discrete or integrated component form, with an ultimate structure therefore being application-specific or design-based.

The wireless communication unit 200 configured as a Sniffer device is arranged to monitor a wireless message exchange between two devices, for example an Initiator radio device and a Reflector radio device, wirelessly received via the antenna 202 and its receiver front-end circuitry 206. The wireless message exchange between the two devices is processed in signal processor 208 to capture IQ samples transmitted by each device. The signal processor 208 is configured to then derive time-stamps of the over-the-air packets as applied by the transmitting device, any modulation errors in the monitored wireless message exchange and a central frequency offset value. In addition, from each of the two devices, the signal processor 208 is also configured to receive (via a wireless or wired data message) from each of the two devices, time-of-departure (ToD) and time-of-arrival (ToA) time-stamps captured by each of the respective two devices. These additional messages may be provided through at least one side communication channel to the Sniffer device. In examples of the invention, the signal processor 208 is configured to use this information, to detect one or more of the following: one or more of the devices' inaccuracy in time-stamp determination; any distortion of the wireless message data packets (or tones), where the distortion is due to, say, device impairments. In some examples, it is envisaged that the wireless communication unit 200 configured as a Sniffer device may determine from this information as to whether an attacker has spoofed the wireless message data packets (or tones), for example in a relay-attack context, that distorts the timing of the packets and thereby the distance measurement.

In some examples, the receiver front-end circuitry 206 of the wireless communication unit 200 configured as a Sniffer device may be configured for narrowband signal reception (where it is arranged to hop through channels synchronously with the two devices) or configured for wideband signal reception (where the receiver front-end circuitry 206 is configured to capture the whole frequency band of the wireless messages at the same time).

The wireless communication unit 200 may also be configured to have access, for example using a side communication channel via interface 205, which is separate from the main wireless communication channel used by the two devices (e.g., an Initiator device and a Reflector device), where the interface 205 connected to at least one side communication channel may be used obtain the measured phase and/or magnitude/time-stamp measurements performed by the two devices (e.g., an Initiator device and a Reflector device) during a normal data exchange operation, that is repeated across a whole frequency range and hopping pattern. It is envisaged that, in this example, the interface 205 to receive the at least one side communication channel may take a form of a wireline static communication interface or a wireless communication interface, where the signal processor 208 may employ a communication protocol, when the wireless communication unit 200 has access to the security keys of the communication protocol being used for the data exchange between the two devices.

Figure 3:
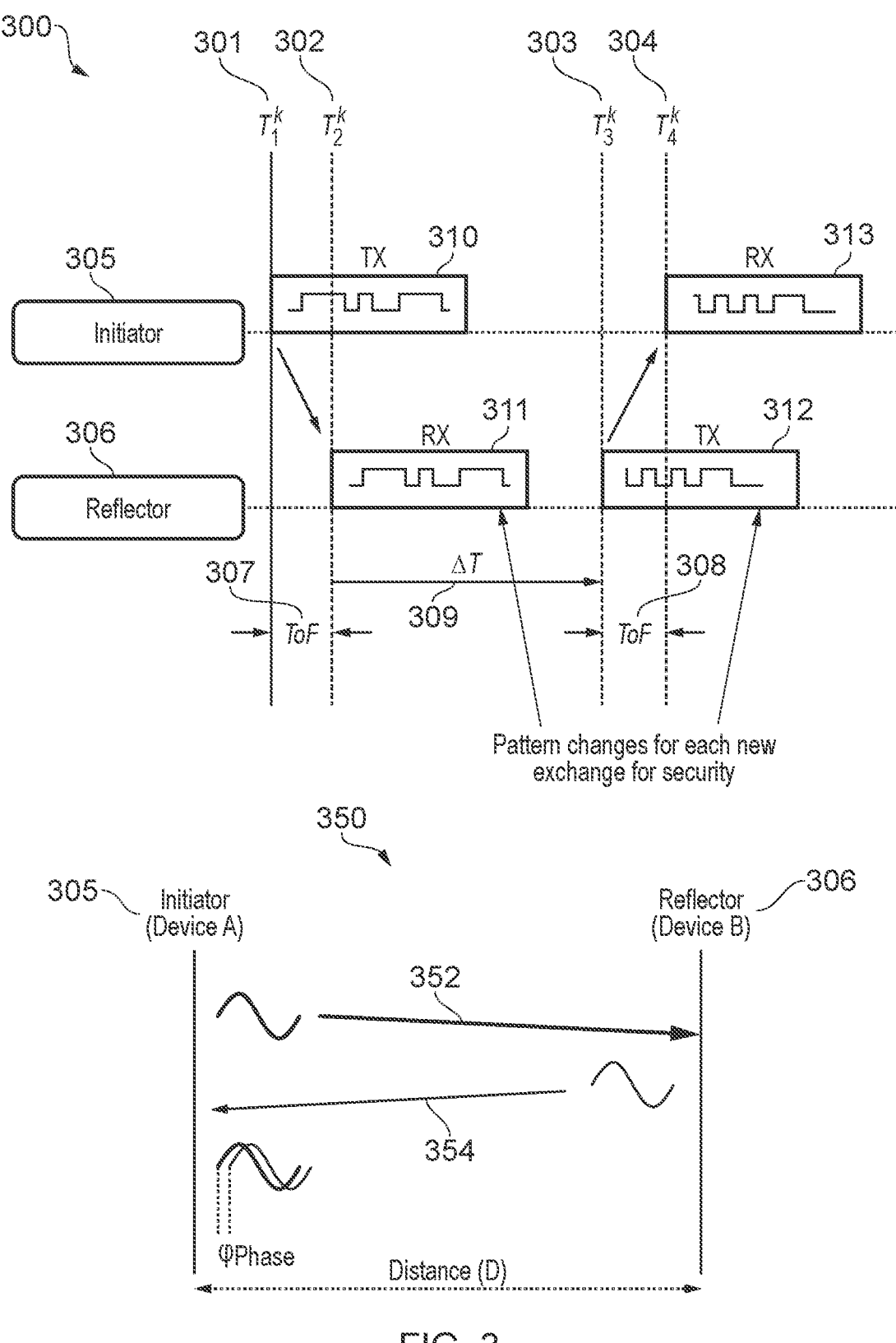
FIG. 3 illustrates a timing diagram of a data exchange, adapted according to some examples of the invention.

Referring now to FIG. 3, an example of a message exchange between an Initiator device 305 and a Reflector device 306 is shown, according to example embodiments of the invention. In accordance with examples of the invention, a third ('Sniffer') device (not shown) is configured to monitor the message exchange between the Initiator device 305 and the Reflector device 306 and determine the contribution of each individual device onto the distance measurement performance. In this example, every message exchange starts with configuration and security steps, i.e., both Initiator device 305 and Reflector device 306 know the modulation being used, the frequency hopping timing being used, the frequency hopping pattern being used, whether to expect a packet or a tone, the duration of the tone signals and the data-rate and modulated bits for the packets, etc. Thus, the sequence and fundamental characteristics of the message exchange are pre-known by both Initiator device 305 and Reflector device 306, as well as by the Sniffer device.

In the first example message exchange 300 of FIG. 3, a data packet 310 is generated by the Initiator radio 'I' 305 and is transmitted with a "send" timestamp (TS) over-the-air. The point at which the TS is generated must be chosen such that jitter is minimised and thus it is usually generated in hardware and, if possible, at the Link Layer (LL) level or at the physical layer (PHY), hence removing any possible software jitter. The packet has a transit time ToF (time of flight) 307 and arrives 311 at Reflector radio 'R' 306 after this time at which point an arrival TS is generated by Reflector radio 'R' 306. After a further time delta-T 309 the packet is re-transmitted 312 by Reflector radio 'R' 306 and sent back to the Initiator radio 'I' 305 with a transmit TS where it is received 313 by the Initiator radio 'I' 305 after a further ToF propagation delay 308. The ToF propagation delays 307 and 308 are (or should be) the same assuming that the distance between the radios does not change within the message exchange period.

For one communication channel, each of the two radios 305, 306 has a time-of-departure $$T_1^k,$$

301, $$T_3^k$$

303 (determined at a time of transmission) and a time-of-arrival $$T_2^k,$$

302, $$T_4^k$$

304 (determined at time of receipt), whereby ideally:

$$T_1^k = T_2^k + ToF \qquad [3]$$

Initiator radio 'I' 305 is measuring and reporting $$\Delta T_I = T_4^k - T_1^k$$

and Reflector device 306 is measuring and reporting $$\Delta T_R = T_3^k - T_2^k.$$

Thus, the time of flight (ToF) is determined as $$ToF = (\Delta T_I - \Delta T_R)/2 \qquad [4]$$

There are errors $$\varepsilon_{x,n}^k$$

associated with each of the time stamps (TSs) that are present in each of the TS measurements, as shown in Table 1 below:

TABLE 1

| Time stamp | Who is measuring the time stamp? | Model of the measured time stamp |
|---|---|---|
| $T_1^k$ (time of departure) | Initiator radio 'I' 305 | $T_1^k = t_1^k + \varepsilon_{I,1}^k$ |
| $T_2^k$ (time of arrival) | Reflector radio 'R' 306 | $T_2^k = t_R^k + ToF + \varepsilon_{R,1}^k$ |
| $T_3^k$ (time of departure) | Reflector radio 'R' 306 | $T_3^k = t_R^k + \Delta T^k + \varepsilon_{R,2}^k$ |
| $T_4^k$ (time of arrival) | Initiator radio 'I' 305 | $T_4^k = t_1^k + \Delta T^k + ToF + \varepsilon_{I,2}^k$ |
| $T_{S,1}^k$ (time of arrival) | Sniffer device | $T_{S,1}^k = t_S^k + ToF_1$ |
| $T_{S,2}^k$ (time of arrival) | Sniffer device | $T_{S,2}^k = t_S^k + \Delta T^k + ToF_2$ |

Where:

$$\varepsilon_{I,1}^k$$

and $$\varepsilon_{I,2}^k$$

are the errors of time stamps recording of Initiator radio 'I' 305;

$$\varepsilon_{R,1}^k$$

and $$\varepsilon_{R,2}^k$$

are the errors of the Reflector radio 'R' 306;

$$t_I^k$$

and $$t_R^k$$

are the timer phases of the two radios (devices under test (DUT)) at the beginning of the exchange on channel k, $\Delta T^k$ is the time between the start of transmission of the packets from the two radios, noting that this timing (defined nominally) is prone to jitter. However, it is noted that the jitter on this term does not affect the result.

For the packet-based distance determination in the first example 300 of FIG. 3, the quality of the timing and modulation of the transmitted data packets is important for performance and can be impacted by factors such as: timing jitter, phase locked loop (PLL) imperfections, crystal imperfections, power amplifier related transients, RX filtering group delay etc.

The Sniffer device may be configured to wirelessly monitor the packet data exchanges between the Initiator radio 'I' 305 and Reflector radio 'R' 306 and determine an impact on the distance estimation error by calculating a combined contribution of the two respective devices.

In a second example message exchange 350 of FIG. 3, a wireless tone 352 with a particular phase and magnitude is generated by the Initiator radio 'I' 305 and is transmitted wirelessly to the Reflector radio 'R' 306. It is envisaged that in a tone-based approach, the timing and the duration of the tone is controlled at the Link Layer (LL). Also, for security, it is envisaged in some examples that the tone duration may be variable from transmission to transmission, according to a bit-pattern. The tone also has a transit time ToF (time of flight) and arrives at Reflector radio 'R' 306. In the tone-based approach, only the IQ values are measured for the tones (as described later). The phase and/or magnitude measurements from the two devices are combined to obtain a global view of the frequency domain channel response, across all available channels. The ToF can be determined by converting the channel response from frequency domain to time domain. Specifically, the ToF may be determined by looking at the channel frequency response over all the channels available (in this example 80 channels across 80 MHz, as shown in equation [12] where the distance corresponds to the estimated ToF if a known 'slope' method is used. After a further time delta-T the tone is re-transmitted 354 by Reflector radio 'R' 306 and sent back to the Initiator radio 'I' 305 where it is received by the Initiator radio 'I' 305 after a further ToF propagation delay. The ToF propagation delays 307 and 308 are (or should be) the same assuming that the distance between the radios does not change within the message exchange period.

In this second example message exchange 350 of FIG. 3, the Initiator radio 'I' 305 and Reflector radio 'R' 306 are sending tones back and forth sweeping some or all the frequency channels. When all the desired channels in the frequency grid are swept, each of the Initiator radio 'I' 305 and Reflector radio 'R' 306 has its own perspective of, say, the 80 MHz channel. In accordance with examples of the invention, the data is centralized in the Sniffer device 200, where the two data portions are combined to obtain a wholistic image of the communication channel. In some examples, the communication channels may be swept sequentially, in which case a relatively stable timing grid (transition to an agreed new frequency) is required, otherwise the data is corrupted, thereby limiting the performance of the localization algorithm.

In the second example 350 of FIG. 3, for simplicity purposes only, the figure shows the exchange on one communication channel only. A signal (in equ. [5]) is transmitted from the Initiator device 305 to the Reflector device 306:

$$s_I(t) = \exp(j\omega_0 t + \varphi_I) \tag{5}$$

The signal then received by the Reflector device 306 is:

$$r_R(t) = \exp(j(\omega_0 t + \varphi_I + \Delta\varphi))^* \exp(-j(\omega_0 t + \varphi_R)) \tag{6}$$

The IQ data captured then by the Reflector device 306 is given by:

$$R: iq_R = \exp(j(\Delta\varphi + \varphi_I - \varphi_R)) \tag{7}$$

The signal transmitted from Reflector device 'R' 306 to Initiator device 'I' 305 is given by:

$$s_R(t) = \exp(j\omega_0 t + \varphi_R) \tag{8}$$

The IQ data captured then by Initiator device 'I' 305 is given by:

$$iq_I = \exp(j(\Delta\varphi + \varphi_R - \varphi_I)) \tag{9}$$

Where: $\Delta\varphi$-phase shift due to channel propagation is:

$$\Delta\varphi = \frac{2\pi f D}{c} \tag{10}$$

and $\varphi_I$ and $\varphi_R$ are the phases of the local oscillators (typically PLLs) of the Initiator device 'I' 305 Reflector device 'R' 306 are unknown and may vary from channel to channel; and $\varphi_I$ and $\varphi_R$ may vary while staying on the same channel leading to phase measurement distortions.

In order to remove the initial phase and/or magnitude, the Sniffer device 200 is configured to combine the two-way IQ measurement values according to:

$$iq^{2w} = iq_R^* iq_I = \exp(2j\Delta\varphi) \tag{11}$$

Following this, the phase of $iq^{2w}$ as $\theta^{2w}$ may be computed and the distance can be estimated:

$$\hat{D} = \frac{c}{2f}\left(\frac{\theta^{2w}}{2\pi} + k\right) \tag{12}$$

where k reflects the phase wrapping of the RF signals when propagating along distance D.

It is noted that k cannot be determined, so, the range of measurement is the distance for which the phase excursion of the RF waves is 2 $\pi$, which gives a maximum range (noting that $\lambda$ is the wavelength):

$$D_{range} = \lambda = \frac{c}{2f} = 6.25 \text{ cm} \tag{13}$$

In order to extend the range of the measurement, the relative phase between different channels in the grid can then be evaluated. For example, one approach could be to directly differentiate measurements from different channels, referred to as 'slope-based phase ranging'. In this case the distance estimate may be given by:

$$\hat{D} = \frac{c}{4\pi} \cdot \left( -\frac{(\varphi_{B,2} + \varphi_{A,2}) - (\varphi_{B,1} + \varphi_{A,1})}{\Delta f} \right) = \frac{c(\theta_1^{2w} - \theta_2^{2w})}{4\pi\Delta f} \qquad [14]$$

where $\varphi_{B,1}$ and $\varphi_{B,2}$ are the phases corresponding to a second device's (e.g., device B's) IQ captured data and $\varphi_{A,1}$ and $\varphi_{A,2}$ are the phases corresponding to first device (e.g., device 'A')

In some examples, for example with respect to BLE™, the range depends on $\Delta f$—for BLE ($\Delta f$=1 MHz):

$$D_{range} = \frac{c}{2\Delta f} = 150 \text{ m} \qquad [15]$$

In a similar manner as the packet-based distance determination in the first example 300, the quality of the tones in the tone-based distance determination in the second example 350 of FIG. 3 is important for performance and can be impacted by factors such as: phase-noise, TX/RX role swap phase inconsistency, frequency synthesis transients etc. Again, the Sniffer device may be configured to wirelessly monitor the packet data exchanges between the Initiator radio 'I' 305 and Reflector radio 'R' 306 and determine an impact on the distance estimation error by calculating a combined contribution of phase shift for the two respective devices.

Figure 4:
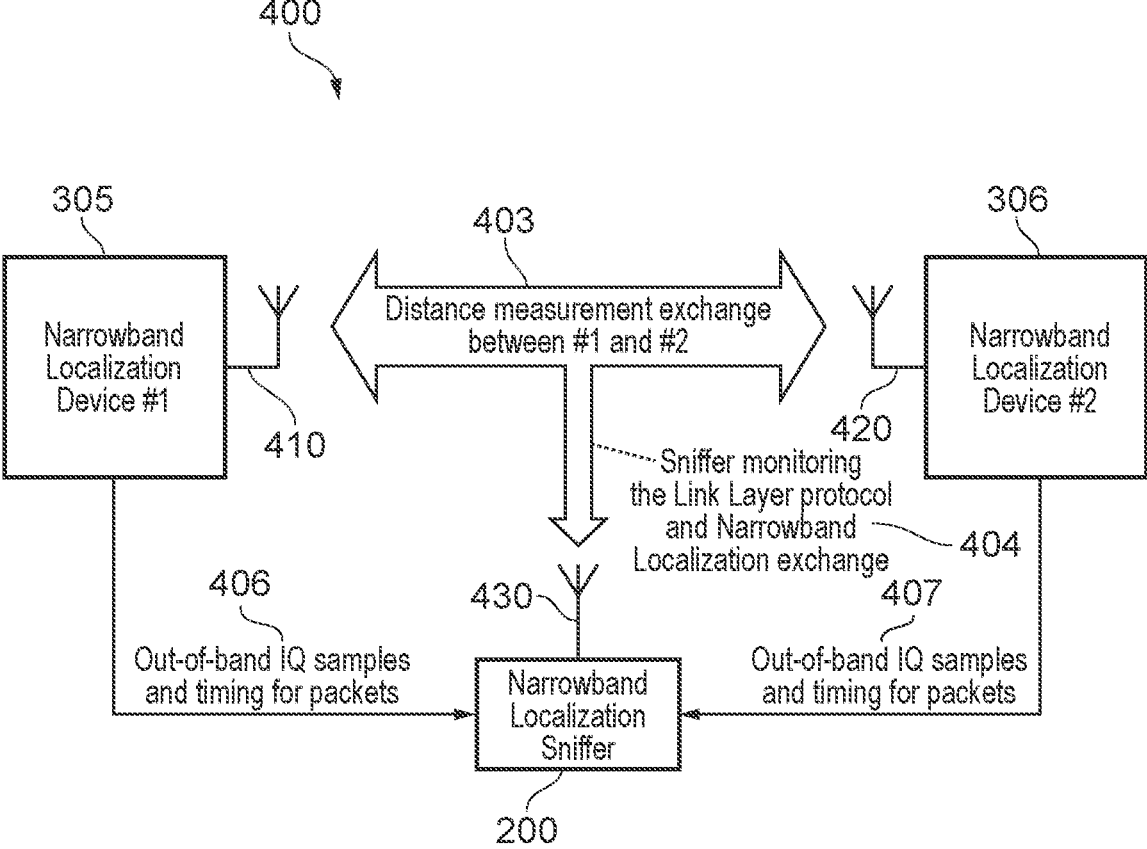
FIG. 4 illustrates one example of a localisation system, according to some examples of the invention.

Referring now to FIG. 4, an example diagram of a communications system 400 is illustrated, adapted according to some examples of the invention. Here, two radio devices 305 and 306 are taking part in a communication or data exchange, whilst a third radio communication device is configured to act as a Sniffer device 200. In this example, every communication or data exchange starts with configuration and security steps, e.g., all three radio devices 305, 306, 200 are configured to know the operating parameters of the communication, e.g., modulation scheme that is being used, the frequency hopping pattern employed, timing characteristics, whether to expect a packet or a tone, the duration of the tone signals and the data-rate and modulation bits for transmit/receive packets, etc.

In this example, each of the radio devices 305, 306, 200 is configured to operate as a narrow-band device with a channel bandwidth of, say, a few megahertz. In the context of some examples of the invention, the term 'narrowband' encompasses in-band spectrum that has a relatively flat frequency spectrum for the typical targeted applications. In a 2.4 GHz communication system, for example, a channel may be considered as being narrowband if the frequency bandwidth is typically less than 6 MHz. Examples of such systems include Bluetooth low energy (BLE™), which has a 1 or 2 MHz bandwidth and IEEE 802.15.4, which has a 2 MHz bandwidth. However, in other realisations, such as Bluetooth Channel Sounding, a narrowband system may be used in a wideband context by sequentially hopping through the whole 80 MHz band and collecting timestamp and/or phase and/or magnitude information in order to perform a single analysis of the whole communication channel and the radio devices operating therein. In order for this to function correctly, the radio devices 305, 306 and 200 must initiate a common pre-planned procedure with known frequencies and data formats, thereby ensuring that the data exchange is secure as no third-party device would be aware of the procedure.

In the communication or data exchange, the two devices 305, 306 transfer time stamps as part of a distance measurement exchange 403 between the two devices 305, 306, via respective wireless antennas 410, 420. One of the devices 305, 306 is running a distance estimation algorithm using the IQ samples and analysing the protocol packets transferred between the devices. Distance estimation may be used to determine proximity of devices (if a single distance is measured) or an exact location (through trilateration if multiple distances are measured from multiple anchors, e.g., real time location systems). In this example, the Sniffer device 200 is configured to monitor the wireless transmissions, via its own antenna 430, and receive and decode the Link Layer (LL) protocol and narrowband localization data exchange between the two devices 305, 306.

In the example of FIG. 4, the Sniffer device 200 is also a narrow band radio. However, in other examples, it is envisaged that Sniffer device 200 could also be configured as a wideband radio device that is capable of receiving and transmitting over the entire channel bandwidth, say 80 MHz, for example. However, noting that in this example the frequency and time hopping pattern of the data transmitted in the data packets, for example data packets 310 of FIG. 3, changes at every communication, the security of the system is maintained. As can be seen in FIG. 4, the Sniffer device 200 connects to the radios 305, 306 via separate side communication channels in order to obtain locally measured data from IQ samples 406, 407 transmitted/received on the side communication channel and the timing thereof for packet reception and decoding. At least one of the two devices (Initiator radio device 'I' or Reflector radio device 'R') is transmitting the measurement data through the side communication channel, which in some examples may use the BLE™ data protocol. In some wireless communication systems, such side communication channels are referred to as sideband channels. Theses IQ samples transmitted/received on the side communication channel enable the Sniffer device 200 to be able to accurately receive and decode the monitored 404 distance measurement exchange 403 between the two radio devices 305, 306. The side communication channels providing the IQ samples 406, 407 in this example, may use wireless interfaces or wired interfaces or a mixture of both.

In accordance with examples of the invention, the Sniffer device 200 is configured to synchronize to, and be able to follow reasonably accurately, the frequency and the timing agreed by the Initiator device 305 and Reflector device 306. In this example, the Sniffer device 200 is also configured to have access, for example using a side communication channel (wired or wireless interface) that is separate from the main communication channel used by the Initiator device 305 and Reflector device 306, where the side communication channel is used obtain the measured phases and/or magnitudes (in a tone-based distance measurement approach) or time-stamp measurements (in a data packet-based distance measurement approach) performed by the Initiator device 305 and Reflector device 306. It is envisaged that, in this example, the at least one side communication channel may take a form of a wireline static communication channel or a wireless communication channel employing a communication protocol, if the Sniffer device 200 has access to the security keys of the communication protocol.

In some examples, the Sniffer device 200 may also be configured to run a post-processing algorithm to perform a protocol analysis. In this example, the Sniffer device 200 may be configured to work with the Bluetooth™ SIG protocol, which is currently being developed and is wholly different from previous Bluetooth™ protocol releases. It is envisaged that the examples herein described may equally be applicable for ranging/localization systems other than 2.4 GHz (80 MHz BW) bands, such as future 5 GHz and 6 GHz bands. It is also envisaged that the examples herein described may equally be applicable for a sniffer device used in one or more of the following wireless communication systems: WiFi™, cellular or ultra-wideband (UWB) communications.

In contrast to other known Sniffer devices, which aim to determine protocol information exchanged between two devices, the Sniffer device 200 is configured to additionally determine how much each of the Initiator device 305 and Reflector device 306 contributes to the degradation of the distance estimation. In some examples, the Sniffer device 200 may also be configured to combine:

(i) a protocol (link layer) sniffing of the protocol information used to prime the localization exchanges;

(ii) the RF sniffing of the physical properties of the waveforms, which are effectively exchanged for distance measurements; and (iii) a protocol (link layer) sniffing of the packets used to exchange the measurement results (time-stamps and IQ samples) between the Initiator device 305 and Reflector device 306.

Thereafter, the post-processing algorithm performed on the captured data by the Sniffer device in order to characterize the effects of the Initiator device 305 and Reflector device 306 separately is significantly different from a regular Sniffer device or signal analyzer.

Figure 5:
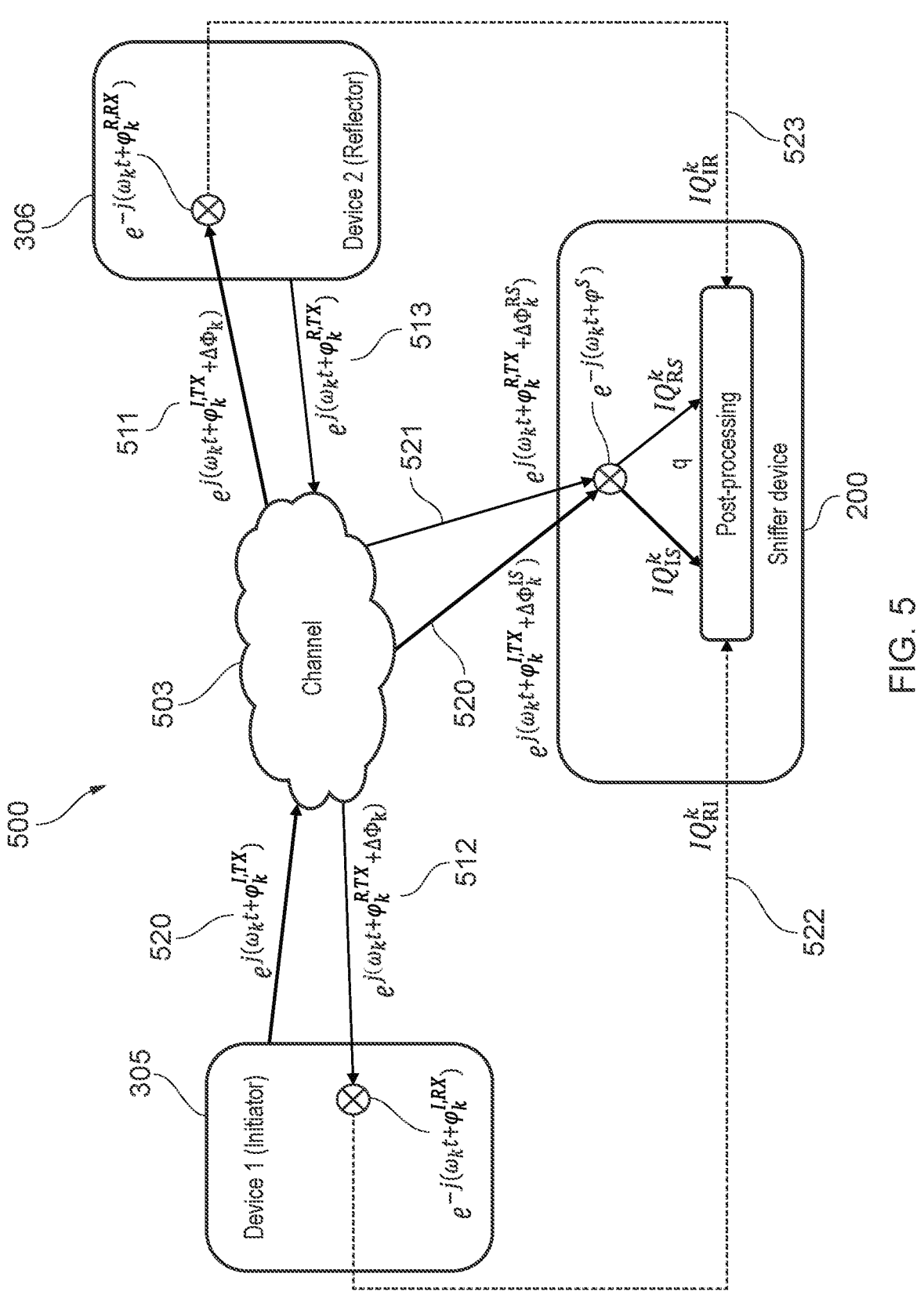
FIG. 5 illustrates a schematic representation of one example of a phase and/or magnitude error calculation process according to some examples of the invention.

Referring now to FIG. 5, a more detailed example description of the data exchange 500 in the communications system 400 of FIG. 4 is illustrated, according to some examples of the invention. In this example, Initiator radio 'I' 501 transmits a signal 510 via a communication channel to Reflector radio 'R' 502, the transmitted signal 510 having a frequency $\omega_k$ and a phase offset $$\varphi_k^{I,TX}.$$

The transmitted signal is received 511 by Reflector radio 'R' 502, where the received signal's phase offset has changed due to a propagation delay by an amount $\Delta\Phi_k$, where the propagation delay is dependent upon the physical properties of the communication channel. In this example, a wireless signal 520 is also received at Sniffer radio 200, where it has a different phase offset $$\Delta\Phi_k^{IS},$$

which depends upon the physical properties of the channel as seen by Initiator radio 'I' 501 and Reflector radio 'R' 502. The signals 511, 520 are demodulated at the Reflector radio 'R' 502 and the Sniffer radio 200 using local oscillators running at the known channel frequency $\omega_k$ but with phase offsets $$\varphi_k^{R,RX}$$

at Reflector radio 'R' 502 and $\varphi^S$ at Sniffer radio 200. The IQ data obtained at the transmitting Initiator radio 'I' 501 and the receiving Reflector radio 502 are transmitted to the Sniffer radio 200 via side communication channels 522 and 503.

The signal is then re-transmitted 513 after some internal delay caused by digital processing and modulation, again at the channel frequency $\omega_k$ but with some local phase offset $$\varphi_k^{R,TX}.$$

This signal is received and demodulated at the Initiator radio 'I' 501 and also Sniffer radio 200, the IQ data again being transmitted to the Sniffer radio 200 via side communication channels 522 and 523. The Sniffer radio 200 also collects IQ data $$IQ_{IS}^k$$

and $$IQ_{RS}^k$$

obtained from the reception and demodulation of transmissions from the Initiator radio 'I' 501 and Reflector radio 'R' 502, whereby the Sniffer radio 200 collects and combines IQ values $$IQ_{IR}^k, IQ_{RI}^k,$$

obtained via the side communication channels and IQ values $$IQ_{IS}^k, IQ_{RS}^k$$

received over-the-air as follows:

$$IQ_{R,combined}^k = \qquad\qquad\qquad [16]$$
$$IQ_{IR}^k * conj(IQ_{IS}^k) * IQ_{RS}^k = e^{j\left(\varphi_k^{R,TX} - \varphi_k^{R,RX}\right)} * e^{j\left(\Delta\Phi_k - \Delta\Phi_k^{IS} + \Delta\Phi_k^{RS}\right)}$$

$$IQ_{I,combined}^k = \qquad\qquad\qquad [17]$$
$$IQ_{RI}^k * conj(IQ_{RS}^k) * IQ_{IS}^k = e^{j\left(\varphi_k^{I,TX} - \varphi_k^{I,RX}\right)} * e^{j\left(\Delta\Phi_k + \Delta\Phi_k^{IS} - \Delta\Phi_k^{RS}\right)}$$

The RHS of these equations being a combination of a predictable linear phase error and a radio-specific error which can be determined. Hence the local phase and/or magnitude errors previously unknown have been calculated by the Sniffer radio device 200.

Figure 6:
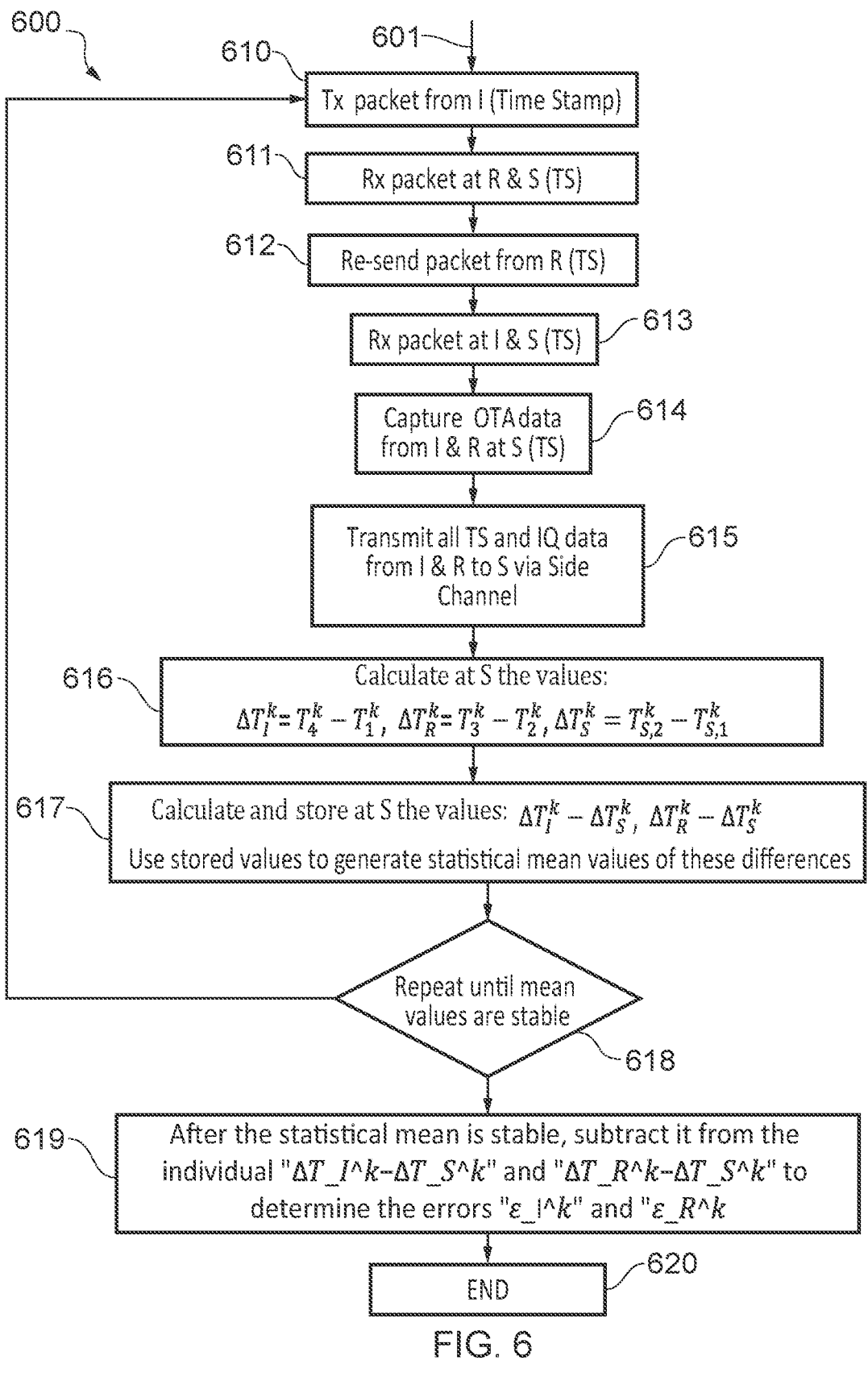
FIG. 6 illustrates an example flowchart of an error estimation process, according to some examples of the invention.

Referring now to FIG. 6 an example flowchart 600 is illustrated in accordance with some examples of the invention, whereby a data packet 601 is received and time stamped and transmitted (with Time Stamp data) at 610 from an Initiator radio 'I'. This data packet, with a pre-defined format, is received at a Reflector radio 'R' at 611 where it is again timestamped and is also received at Sniffer radio 'S'.

The data packet is re-transmitted (with its Time Stamp data) from Reflector radio 'R' at 612 and received at 613 by the Initiator radio 'I' and Sniffer radio 'S'. At 614, the Sniffer radio 'S' captures these over-the-air transmissions from Initiator radio 'I' and Reflector radio 'R', with respective Time Stamps.

Furthermore, at 615, all IQ data corresponding to the data packets, as they are transmitted and received, is collected at the Initiator radio 'I' and Reflector radio 'R' and one or both devices transmit this collected data via side communication channels (wireless say using a BLE protocol or wireline) to Sniffer radio 'S'.

At 616, the Sniffer radio 'S' processes the timestamps, for example by means of a local microprocessor or field programmable gate array (FPGA) or other processing device, in order to generate time differences and calculates this as follows:

$$\Delta T_I^k = T_4^k - T_1^k, \Delta T_R^k = T_3^k - T_2^k, \Delta T_S^k = T_{S,2}^k - T_{S,1}^k \qquad [18]$$

At 616, the Sniffer radio 'S' further processes the values in eq. [18] to generate the time differences and stores these:

$$\Delta T_I^k - \Delta T_S^k, \Delta T_R^k - \Delta T_S^k \qquad [19]$$

These time differences are subject to stochastic timing errors, due to the statistical nature of the processes involved, e.g., stability of local oscillators, timing jitter in software execution, phase noise and local oscillator phase inconsistency when switching between transmit and receive operations. The Sniffer radio 'S' then uses the stored values to generate statistical mean values of these differences.

The flowchart then loops at 618 back to 610, repeating these operations until the mean values are stable. Once the mean values are stable at 618, then, at 619, the Sniffer radio 'S' subtracts the stable mean values from the individual "$\Delta T\_I\hat{}k - \Delta T\_S\hat{}k$" and "$\Delta T\_R\hat{}k - \Delta T\_S\hat{}k$" to determine the errors "$\varepsilon\_I\hat{}k - \varepsilon\_R\hat{}k$". In this manner, the Sniffer radio 'S' is able to determine how much phase and/or magnitude error is being introduced by each individual communication device, i.e., Initiator radio 'I' and Reflector radio 'R', in the two-way exchange. In some examples, Sniffer radio 'S' combines over-the-air collected IQ samples with the IQ samples measured by the Initiator radio 'I' and the Reflector radio 'R' and determines a phase and/or magnitude distortion contributed by each device, or combines over-the-air collected time-stamps with the time-stamps measured by the Initiator radio 'I' and the Reflector radio 'R' and determines therefrom time-stamp distortion contributed by each device. The process then stops at 620.

In this manner, the Sniffer radio 'S' monitors Link Layer protocol packets (or tones) to acquire configuration, security and synchronization information. The Sniffer radio 'S' uses this information to align timing with the Initiator radio 'I' and the Reflector radio 'R', to obtain details of the frequency hopping pattern, to know the frequency dwell time for each channel, to know whether packets or tones are being exchanged on a certain channel for distance measurement and to know the bit pattern used for the packets. In some examples, security keys may be made available to the Sniffer device prior to the monitoring operation, in order to align timing and start hopping through the different channels according to the sequence determined above. At (or after) 611, 613, Sniffer radio 'S' captures IQ samples for the tones (where tones are being exchanged) or captures time-stamps for the data packets, by monitoring the over-the-air waveforms (IQ samples and time-stamps are collected on the waveforms transmitted by both Initiator radio 'I' and the Reflector radio 'R').

FIG. 7 illustrates an example flowchart of a method (700) of monitoring of a communication exchange between two wireless communication devices, in which the method includes, at a communication device configured to function as a Sniffer device, synchronizing to a frequency and a timing employed between the two wireless communication devices on a main wireless communication channel (702); monitoring wireless communication exchanges between the two wireless communication devices on the main wireless communication channel, where the wireless communication exchanges are one of: packet-based communication exchanges or tone-based communication exchanges (704); repeating the monitoring on the main wireless communication devices across a plurality of different frequencies (706); combining a plurality of at least one of phase measurements or magnitude measurements from the respective two wireless communication devices (708); and determining a value of phase error introduced by each of the two wireless communication devices based on the combined plurality of the at least one of phase measurements or magnitude measurements (710).

In accordance with examples of the invention, the described system, communication units, circuits, and methods may provide an accurate way to measure and compensate for timing errors introduced by individual radios in a communications system. Advantageously the errors contributed by individual radios can be calculated; hence allowing the performance of the radios to be individually analyzed. This increases the accuracy of time of flight (ToF) times and, hence, the calculation of distances between radios.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also, for example, the examples, or portions thereof, may implemented as soft or code representations of physical circuitry or of logical representations convertible into physical circuitry, such as in a hardware description language of any appropriate type. Also, examples of the invention are not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

22

The invention claimed is:

1. A method of monitoring of a communication exchange between two wireless communication devices, the method comprising, at a communication device configured to function as a Sniffer device:

synchronizing to a frequency and a timing employed between the two wireless communication devices on a main wireless communication channel;

monitoring wireless communication exchanges between the two wireless communication devices on the main wireless communication channel, where the wireless communication exchanges are one of: packet-based communication exchanges or tone-based communication exchanges;

repeating the monitoring on the main wireless communication channel of wireless communication exchanges between the two wireless communication devices across a plurality of different frequencies;

combining a plurality of at least one of phase measurements or magnitude measurements from the respective two wireless communication devices; and determining a value of phase error introduced by each of the two wireless communication devices based on the combined plurality of the at least one of phase measurements or magnitude measurements.

2. The method of monitoring of claim 1, further comprising:

receiving information from each of the two wireless communication devices via at least one side communication channel that is separate from the main communication channel, wherein the received information comprises at least one of:

respective phase measurements of wireless communication exchanges between the two wireless communication devices, respective magnitude measurements of wireless communication exchanges between the two wireless communication devices, or respective time-stamp measurements of wireless communication exchanges between the two wireless communication devices, measured by the two wireless communication devices on the main wireless communication channel from the wireless communication exchanges; and repeating the monitoring on the main wireless communication channel and receiving information from each of the two wireless communication devices via the at least one side communication channel across the plurality of different frequencies.

3. The method of monitoring of claim 2 wherein the at least one side communication channel is one of a wireline static communication channel or a wireless communication channel employing a communication protocol when the communication device configured to function as the Sniffer device has access to security keys of the communication protocol.

4. The method of monitoring of claim 2 further comprising:

combining first quadrature (IQ) values $$IQ_{IR}^{k}, IQ_{RI}^{k},$$

received via the at least one side communication channels and second quadrature (IQ) values $$IQ_{IS}^k, IQ_{RS}^k$$

received over-the-air using equations:

$$IQ_{R,combined}^k = IQ_{IR}^k * conj(IQ_{IS}^k) * IQ_{RS}^k = e^{j\left(\varphi_k^{R,TX} - \varphi_k^{R,RX}\right)} * e^{j\left(\Delta\Phi_k - \Delta\Phi_k^{IS} + \Delta\Phi_k^{RS}\right)}$$

$$IQ_{I,combined}^k = IQ_{RI}^k * conj(IQ_{RS}^k) * IQ_{IS}^k = e^{j\left(\varphi_k^{I,TX} - \varphi_k^{I,RX}\right)} * e^{j\left(\Delta\Phi_k + \Delta\Phi_k^{IS} - \Delta\Phi_k^{RS}\right)}$$

wherein a right-hand side of the equations provide a combination of a predictable linear of at least one of phase error, magnitude error, or a radio-specific error.

5. The method of monitoring of claim 1, wherein combining the plurality of the at least one of phase measurements or magnitude measurements from the respective two wireless communication devices comprises one of:

multiplying IQ values in a quadrature (IQ) domain; or adding at least one of phase measurements or magnitude measurements in a phase domain when using tone-based communication exchanges.

6. The method of monitoring of claim 1 wherein at least one of quadrature measurements, phase measurements, or magnitude measurements is performed in a phase domain using tone-based data exchanges, wherein combining the plurality of the at least one of phase measurements or magnitude measurements from the respective two wireless communication devices comprises adding a plurality of at least one of quadrature measurements, phase measurements, or magnitude measurements.

7. The method of monitoring of claim 1 further comprising obtaining a distance measurement between the two wireless communication devices based on one of:

time-stamps of received packet-based communication exchanges; or at least one of phase measurements or magnitude measurements of received tone-based communication exchanges.

8. The method of monitoring of claim 7 wherein the distance measurement between the two wireless communication devices comprises one of:

channel sounding information in a Bluetooth™ SIG wireless system; or a secure distance measurement in an 80 MHz ISM band.

9. The method of monitoring of claim 1 wherein the method further comprises determining inconsistencies between transmit information and receive information, received from each of the respective two wireless communication devices using the at least one of phase measurements or magnitude measurements.

10. The method of monitoring of claim 1 wherein the two wireless communication devices comprise: an Initiator radio device (I) with a normally distributed channel-k timing error $$\varepsilon_I^k,$$

and a Reflector radio device (R) with a normally distributed channel k timing error $$\varepsilon_R^k.$$

11. The method of monitoring of claim 10, the method comprising at the communication device configured to function as the Sniffer device:

receiving a radio transmission of a first data packet from the Initiator radio device (I) that includes a first departure time stamp $$T_1^k,$$

that is also received at the Reflector radio device (R) that generates an arrival timestamp $$T_2^k$$

in response thereto;

receiving a radio re-transmission of the first data packet from the Reflector radio device (R) that includes a second departure timestamp $$T_3^k$$

that is also received at the Initiator radio device (I) that generates an arrival timestamp $$T_4^k,$$

in response thereto;

capturing of over-the-air transmissions from the Initiator radio device (I) and the Reflector radio device (R) that includes quadrature (IQ) values and a generation of arrival timestamps $$T_{s,1}^k, T_{s,2}^k;$$

calculating a first delta time value $$\Delta T_I^k = T_4^k - T_1^k,$$

calculating a second delta time value $$\Delta T_R^k = T_3^k - T_2^k,$$

calculating a third delta time value $$\Delta T_S^k = T_{S,2}^k - T_{S,1}^k$$

calculating a fourth delta time value $$\Delta T_I^k - \Delta T_S^k,$$

calculating a fifth delta time value $$\Delta T_R^k - \Delta T_S^k,$$

repeating the receiving, capturing and calculating operations across multiple channels; and
calculating statistical mean values of differences between the first delta time value and third delta time value $$\left(\Delta T_I^k - \Delta T_S^k\right)$$

and between the second delta time value and third delta time value $$\left(\Delta T_R^k - \Delta T_S^k\right),$$

wherein the calculated statistical mean values across multiple channels converge to a channel timing error of the Initiator radio (I)

$$\varepsilon_I^k$$

and a channel timing error of the Reflector radio (R)

$$\varepsilon_R^k.$$

12. The method of monitoring of claim 1 further comprising the communication device configured to function as the Sniffer device having a priori knowledge of at least one parameter in the communication exchange on the main communication channel selected from a group consisting of modulation used, frequency hopping timing used, frequency hopping pattern used, whether a packet or a tone is to be received, a duration of tone signals, a data-rate and number of modulated bits for data packets, wherein the method further comprises:
  synchronizing with the communication exchange by the communication device using the at least one parameter after first receiving a packet or a tone on the main communication channel.

13. A communication device configured to operate as a wireless Sniffer device and monitor a wireless communication exchange between two wireless communication devices, the communication device comprising:
  a frequency generation and timing circuit configured to synchronize the communication device to a frequency and a timing employed between the two wireless communication devices on a main wireless communication channel;

a receiver circuit coupled to the frequency generation and timing circuit and configured to receive the wireless communication exchanges between the two wireless communication devices on the main wireless communication channel, wherein the wireless communication exchanges comprise one of packet-based communication exchanges or tone-based communication exchanges;
  a signal processor coupled to the receiver circuit and configured to:
    process the received wireless communication exchanges;
    combine a plurality of at least one of phase measurements or magnitude measurements from the respective two wireless communication devices, following repeated operations of the monitored main wireless communication channel across a plurality of different frequencies; and
    determine, based on the combined plurality of at least one of phase measurements or magnitude measurements, a value of at least one of phase error or magnitude error, introduced by each of the two wireless communication devices.

14. The communication device of claim 13, further comprising:
  an interface, operably coupled to the signal processor and configured to receive information from each of the two wireless communication devices via at least one side communication channel that is separate from the main communication channel, wherein the information comprises at least one of respective phase measurements, respective magnitude measurements, or time-stamp measurements measured by the two wireless communication devices on the main wireless communication channel from the wireless communication exchanges,
  wherein the signal processor is configured to combine a plurality of the at least one of respective phase measurements, respective magnitude measurements, or time-stamp measurements from the respective two wireless communication devices, following repeated operations of the monitored main wireless communication channel and received information from each of the two wireless communication devices via the at least one side communication channel across the plurality of different frequencies.

15. The communication device of claim 13, wherein combining the plurality of the at least one of respective phase measurements or respective magnitude measurements from the respective two wireless communication devices comprises one of:
  multiplying quadrature (IQ) value measurements in a quadrature (IQ) domain following packet data communication exchanges;
  adding at least one of respective phase measurements or respective magnitude measurements in a phase domain following tone-based communication exchanges.

* * * * *